United States Patent
Jang

(10) Patent No.: US 11,110,815 B2
(45) Date of Patent: Sep. 7, 2021

(54) METHOD AND APPARATUS FOR CONTROLLING POWER OF MILD HYBRID ELECTRIC VEHICLE

(71) Applicants: Hyundai Motor Company, Seoul (KR); Kia Motors Corporation, Seoul (KR)

(72) Inventor: Hwa Yong Jang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 196 days.

(21) Appl. No.: 16/100,662

(22) Filed: Aug. 10, 2018

(65) Prior Publication Data

US 2019/0184845 A1    Jun. 20, 2019

(30) Foreign Application Priority Data

Dec. 15, 2017  (KR) .................. 10-2017-0173617

(51) Int. Cl.
| | |
|---|---|
| *B60K 6/26* | (2007.10) |
| *B60W 10/08* | (2006.01) |
| *B60L 58/16* | (2019.01) |
| *B60L 58/12* | (2019.01) |
| *B60L 50/60* | (2019.01) |
| *B60L 58/20* | (2019.01) |
| *B60L 58/13* | (2019.01) |
| *B60L 50/16* | (2019.01) |

(52) U.S. Cl.
CPC ............... *B60L 58/16* (2019.02); *B60K 6/26* (2013.01); *B60L 50/16* (2019.02); *B60L 50/60* (2019.02); *B60L 58/12* (2019.02); *B60L 58/13* (2019.02); *B60L 58/20* (2019.02); *B60W 10/08* (2013.01); *B60L 2240/547* (2013.01)

(58) Field of Classification Search
CPC .......... B60L 58/16; B60L 50/60; B60L 50/16; B60L 2240/547; B60L 58/12; B60L 58/13; B60K 2006/4833; B60K 6/26; B60K 6/485; B60W 10/06; B60W 10/08
See application file for complete search history.

(56) References Cited

U.S. PATENT DOCUMENTS

| | | | |
|---|---|---|---|
| 2009/0212626 A1* | 8/2009 | Snyder | B60L 50/40 307/10.1 |
| 2016/0096521 A1* | 4/2016 | Jang | B60W 10/26 701/22 |
| 2016/0308259 A1* | 10/2016 | Eifert | H01M 10/486 |
| 2017/0093207 A1* | 3/2017 | Park | H02J 7/0068 |
| 2018/0072300 A1* | 3/2018 | Jang | H02J 7/342 |

* cited by examiner

*Primary Examiner* — Jeffrey P Aiello
(74) *Attorney, Agent, or Firm* — Morgan, Lewis & Bockius LLP

(57) ABSTRACT

A method for controlling a mild hybrid electric vehicle may include detecting degradation state of a first battery, determining whether the degradation state of the first battery exceeds a degradation reference value or not, stopping normal operation of a mild hybrid starter & generator (MHSG) if the degradation state of the first battery exceeds a degradation reference value, determining whether an SOC value of a second battery is below a charge reference value or not, and operating the MHSG restrictively and inducing electric power conversion to the second battery if the SOC value of the second battery is below the charge reference value.

9 Claims, 3 Drawing Sheets

METHOD AND APPARATUS FOR CONTROLLING POWER OF MILD HYBRID ELECTRIC VEHICLE

CROSS-REFERENCE TO RELATED APPLICATION

The present application claims priority to Korean Patent Application No. 10-2017-0173617 filed on Dec. 15, 2017, the entire contents of which is incorporated herein for all purposes by this reference.

BACKGROUND OF THE INVENTION

Field of the Invention

The present invention relates to a method and an apparatus for controlling electric power of a mild hybrid electric vehicle. More particularly, the present invention relates to a method and an apparatus for controlling electric power of a mild hybrid electric vehicle in which electric power is controlled when a battery of the mild hybrid electric vehicle is degraded.

Description of Related Art

As is generally known in the art, a hybrid electric vehicle utilizes an internal combustion engine and a battery power source together. The hybrid electric vehicle efficiently combines torque of the internal combustion engine and a torque of a motor.

Hybrid electric vehicles may be divided into a hard type and a mild type according to a power sharing ratio between an engine and a motor. In a case of the mild type of hybrid electric vehicle (hereinafter referred to as a mild hybrid electric vehicle), a mild hybrid starter & generator (MHSG) configured to start the engine or generate electricity according to an output of the engine is used instead of an alternator. In the case of the hard type of hybrid electric vehicle, a driving motor for generating driving torque is used in addition to an integrated starter & generator (ISG) configured to start the engine or generate electricity.

The mild hybrid vehicle may assist an engine torque according to a running state by use of the MHSG and may charge a battery (e.g., 48 V battery) through a regenerative braking. Accordingly, fuel efficiency of the mild hybrid electric vehicle may be improved.

By the way, when the battery of the mild hybrid vehicle is degraded, normal driving power production and electric power recharge is impossible, therefore vehicle fuel efficiency becomes deteriorated, further there is a risk of explosion and fire of the vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and an apparatus configured for controlling a mild hybrid electric vehicle detecting degradation of the battery of the mild hybrid vehicle and controlling electric power when a battery of the mild hybrid electric vehicle is degraded.

A method for controlling a mild hybrid electric vehicle according to an exemplary embodiment of the present invention may include detecting degradation state of a first battery, determining whether the degradation state of the first battery exceeds a degradation reference value or not, stopping normal operation of a mild hybrid starter & generator (MHSG) if the degradation state of the first battery exceeds a degradation reference value, determining whether an SOC value of a second battery is below a charge reference value or not, and operating the MHSG restrictively and inducing electric power conversion to the second battery if the SOC value of the second battery is below the charge reference value.

The degradation state of the first battery may be detected by at least one of vehicle starting time, charging time of the first battery, the number of times of voltage variation of the first battery, a maximum absolute value of the voltage variation of the first battery, and an internal temperature of the first battery.

The first battery may be a 48V battery, and the second battery may be a 12V battery.

At the stopping normal operation of a MHSG, an electric power generated from the MHSG may not be charged at the first battery.

At the operating the MHSG restrictively and inducing electric power conversion to the second battery, an electric power generated from the MHSG may be converted to the second battery by a low voltage DC-DC converter (LDC) so that the second battery is charged.

At the Operating the MHSG restrictively and inducing electric power conversion to the second battery, the MHSG may be generated during T1, and the electric power may be converted to the second battery during T2 which is longer than T1.

The method for controlling a mild hybrid electric vehicle according to an exemplary embodiment of the present invention may further include warning degradation state of the first battery to a driver after the stopping normal operation of a MHSG if the degradation state of the first battery exceeds a degradation reference value.

An apparatus configured for controlling electric power of a mild hybrid electric vehicle according to an exemplary embodiment of the present invention may include an engine, a mild hybrid starter & generator (MHSG) starting the engine or being generated by output of the engine, a first battery supplying electricity to the MHSG or being charged by electricity recovered by the MHSG, and a controller stopping normal operation of a mild hybrid starter & generator (MHSG) if the degradation state of the first battery exceeds a degradation reference value, wherein the controller is configured to determine whether an SOC value of a second battery is below a charge reference value or not if the degradation state of the first battery exceeds a degradation reference value, and operates the MHSG restrictively and inducing electric power conversion to the second battery if the SOC value of the second battery is below the charge reference value.

The degradation state of the first battery may be detected by at least one of vehicle starting time, charging time of the first battery, the number of times of voltage variation of the first battery, a maximum absolute value of the voltage variation of the first battery, and an internal temperature of the first battery.

The first battery may be a 48V battery, and the second battery may be a 12V battery.

The controller may be configured to control such that an electric power generated from the MHSG is not charged at the first battery is if the degradation state of the first battery exceeds a degradation reference value.

The controller may be configured to control such that an electric power generated from the MHSG is converted to the second battery by a low voltage DC-DC converter (LDC) so that the second battery is charged if the degradation state of the first battery exceeds a degradation reference value and the SOC value of the second battery is below the charge reference value.

The controller may be configured to control such that the MHSG is generated during T1, and the electric power is converted to the second battery during T2 which is longer than T1.

The controller may be configured to control to warn degradation state of the first battery to a driver if the degradation state of the first battery exceeds a degradation reference value.

As explained above, according to an exemplary embodiment of the present invention, charging function is shut off so that electric power generated from the MHSG is not absorbed, therefore additional vehicle damage is prevented from, and electric power conversion and charging to the low electric power battery is induced to assist temporary driving.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
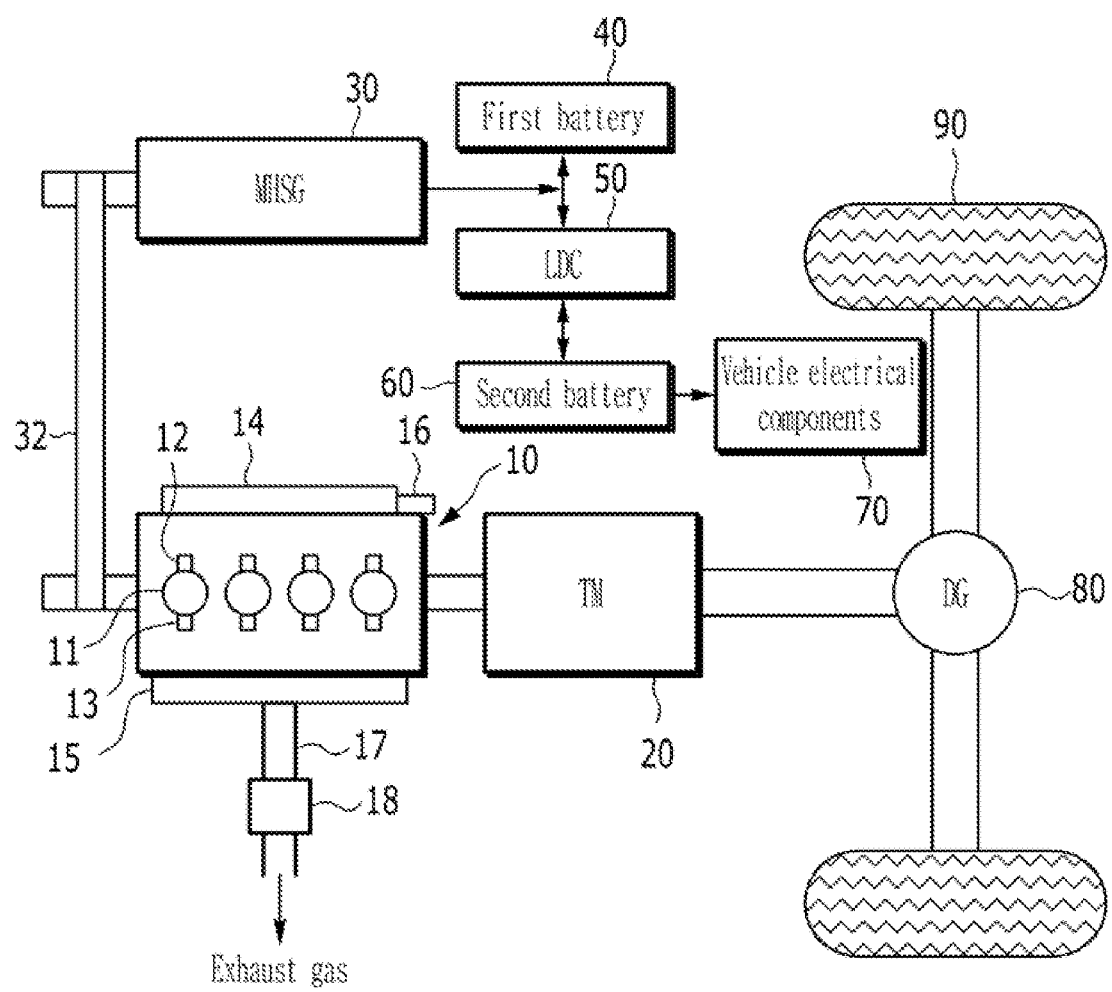
FIG. 1 is a block diagram of a mild hybrid electric vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, various exemplary embodiments of Exemplary embodiments of the present application will be described more fully with reference to the accompanying drawings, in which exemplary embodiments of the invention are shown. However, the present invention is not limited the exemplary embodiments which are described herein, and may be modified in various different ways.

Parts which are not related with the description are omitted for clearly describing the exemplary embodiment of the present invention, and like reference numerals refer to like or similar elements throughout the specification.

Since each component in the drawings is arbitrarily illustrated for easy description, the present invention is not particularly limited to the components illustrated in the drawings.

FIG. 1 is a block diagram of a mild hybrid electric vehicle according to an exemplary embodiment of the present invention.

As shown in FIG. 1, a mild hybrid electric vehicle according to an exemplary embodiment of the present invention may include an engine 10, a transmission 20, a mild hybrid starter & generator (MHSG) 30, a first battery 40, a differential gear apparatus 80, and a wheel 90.

The engine 10 combusts fuel and air to convert chemical energy to mechanical energy.

In connection with torque transmission of the mild hybrid electric vehicle, torque generated from the engine 10 is transmitted to an input shaft of the transmission 20, and a torque output from an output shaft of the transmission 20 is transmitted to an axle via the differential gear apparatus 80. The axle rotates the wheel 90 such that the mild hybrid electric vehicle runs by the torque generated from the engine 10.

The MHSG 30 converts electrical energy to mechanical energy, or mechanical energy to electrical energy. That is, the MHSG 30 starts the engine 10 or generates electricity according to an output of the engine 10. Furthermore, the MHSG 30 may assist the torque of the engine 10. The torque of the engine 10 may be used as main torque and a torque of the MHSG 30 may be used as auxiliary torque. The engine and the MHSG 30 may be connected to each other through a belt 32.

The first battery 40 may supply electricity to the MHSG 30, and may be charged through electricity recovered through the MHSG 30 in a regenerative braking mode. The first battery 40 may be a 48 V battery. The mild hybrid electric vehicle may further include a low voltage DC-DC converter (LDC) converting a voltage supplied from the first battery 40 into a low voltage, and a second battery 60 supplying a low voltage to electrical components (e.g., a headlamp, an air conditioner, and a wiper). The second battery 60 may be a 12 V battery.

The engine 10 may include a plurality of combustion chambers 11 into which fuel and air flow, an ignition device 12 igniting the fuel and the air flowing into the combustion chamber 11, and an injector 13 injecting the fuel. The engine 10 is connected to an intake manifold 14 to receive the air in the combustion chamber 11, and exhaust gas generated in a combustion process is gathered in an exhaust manifold 15 and is expelled to the external of the engine 10. The injector 13 may be mounted in the combustion chamber 11 or the intake manifold 14.

A throttle valve 16 is disposed on an intake line supplying air to the intake manifold 14. Air flow supplied to the intake manifold 14 is controlled according to an opening amount of the throttle valve 16.

The exhaust pipe 17 is connected to the exhaust manifold 15 to exhaust the exhaust gas to the external of the mild hybrid electric vehicle. A catalyst 18 may be mounted on the exhaust pipe 17 and remove hydrocarbons, carbon monoxide, and nitrogen oxide (NOx) contained in the exhaust gas.

The controller is configured to determine whether the degradation state of the first battery exceeds a degradation reference value or not, and determines whether an SOC value of a second battery 60 is below a charge reference value or not if the degradation state of the first battery 40 exceeds a degradation reference value.

At the present time, the degradation state of the first battery 40 may be detected by at least one of vehicle starting time, charging time of the first battery 40, the number of times of voltage variation of the first battery 40, a maximum absolute value of the voltage variation of the first battery 40, and an internal temperature of the first battery 40. The degradation reference value may be set by a person of ordinary skill in the art through an experiment.

The controller operates the MHSG 30 restrictively and induces electric power conversion to the second battery 60 if the SOC value of the second battery 60 is below the charge reference value.

The controller controls such that an electric power generated from the MHSG 30 is not charged at the first battery 40. Furthermore, the controller controls such that an electric power generated from the MHSG 30 is converted to the second battery 60 by a low voltage DC-DC converter (LDC) so that the second battery 60 is charged if the degradation state of the first battery 40 exceeds a degradation reference value and the SOC value of the second battery 60 is below the charge reference value.

The controller controls such that the MHSG 30 is generated during T1, and the electric power is converted to the second battery 60 during T2 which is longer than T1.

Furthermore, the controller controls to warn degradation state of the first battery 40 to a driver if the degradation state of the first battery 40 exceeds a degradation reference value.

The controller may be implemented with one or more processors executed by a predetermined program. The predetermined program may include a series of commands for performing each step included in a method for controlling electric power of the mild hybrid electric vehicle according to an exemplary embodiment of the present invention to be described below.

Figure 2:
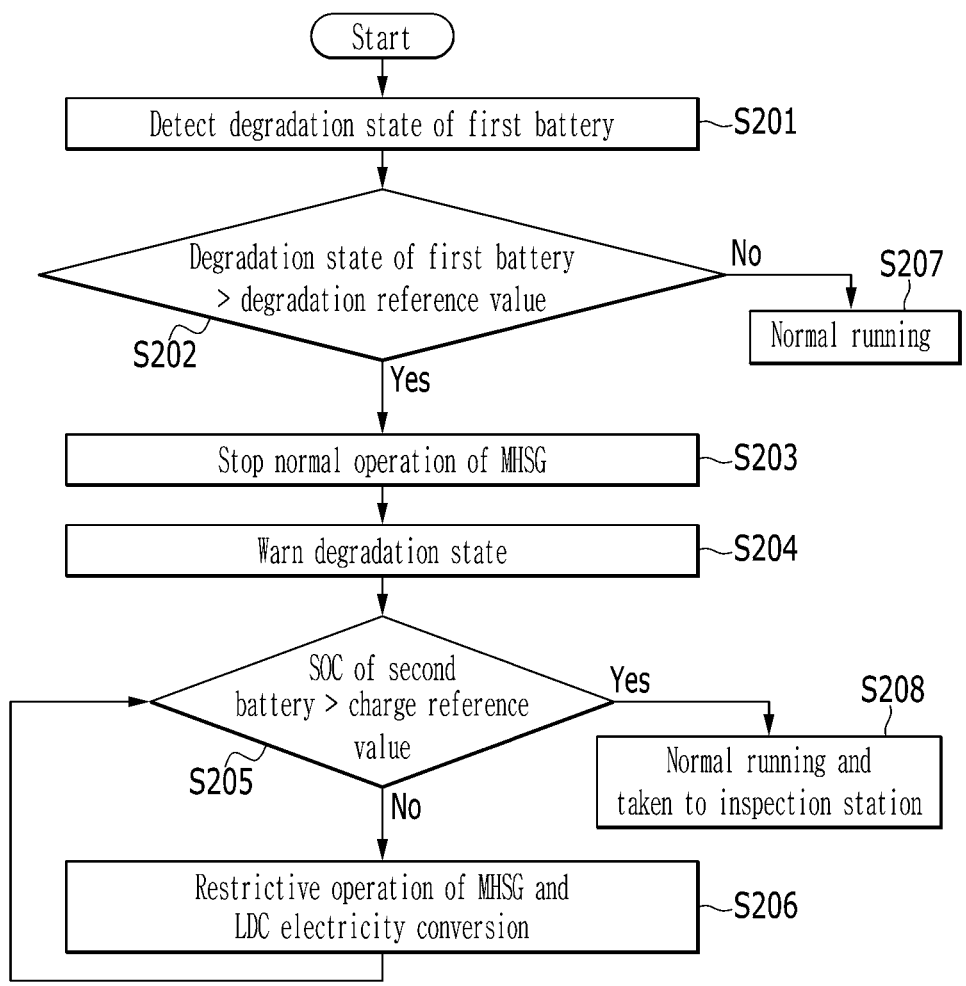
FIG. 2 is a flowchart of a method for controlling electric power of a mild hybrid electric vehicle according to an exemplary embodiment of the present invention.

FIG. 2 is a flowchart of a method for controlling electric power of a mild hybrid electric vehicle according to an exemplary embodiment of the present invention.

Referring to FIG. 2, firstly, degradation state of a first battery is detected S201, and whether the degradation state of the first battery exceeds a degradation reference value or not is determined S202.

The degradation state of the first battery may be detected by at least one of vehicle starting time, charging time of the first battery, the number of times of voltage variation of the first battery, a maximum absolute value of the voltage variation of the first battery, and an internal temperature of the first battery. At the present time, the degradation reference value may be set by a person of ordinary skill in the art through an experiment.

As such, normal operation of a mild hybrid starter & generator (MHSG) is stopped if the degradation state of the first battery exceeds a degradation reference value S203, and degradation state of the first battery is warned to a driver S204. At the stopping normal operation of a MHSG S203, an electric power generated from the MHSG is not charged at the first battery, and internal relay is cut off and charging function is shut off.

If the degradation state of the first battery does not exceed a degradation reference value, the first battery is determined to be doing normal function, therefore the vehicle normally runs S207.

As such, whether an SOC value of a second battery is below a charge reference value or not is determined S205.

At the present time, the charge reference value may be set by a person of ordinary skill in the art through an experiment. For example, the charge reference value may be a charging amount which electrical load may be supplied by the SOC value of the 12V battery and the vehicle may reach an inspection station.

The MHSG operates restrictively and electric power conversion is induced to the second battery if the SOC value of the second battery is below the charge reference value S206. The electric power generated form the MHSG is converted to the second battery by a low voltage DC-DC converter (LDC) so that the second battery is charged.

The vehicle normally runs and is taken to the inspection station if the SOC value of the second battery exceeds the charge reference value S208.

If the SOC value of the second battery is below the charge reference value, the controller sends a signal so that the MHSG and the LDC operate together, and a high voltage generated during T1 is temporarily stored in a power-net. The controller commands to the LDC at the same time of operation of the MHSG to convert the high voltage stored in the power-net during T2. At the present time, T2 is set to be longer than T1 so that the voltage generated from the MHSG is sufficiently converted through the LDC.

The controller finishes the LDC control after T2, monitors variation of the SOC value of the second battery, and continues the operation to maintain the SOC value of the second battery to be above a predetermined value.

Figure 3:
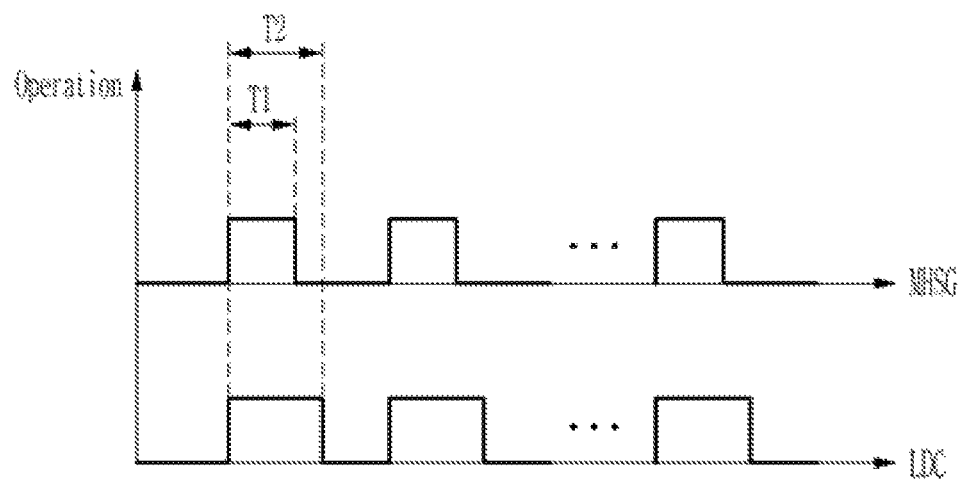
FIG. 3 is a graph for explaining a method for controlling electric power of a mild hybrid electric vehicle according to an exemplary embodiment of the present invention.

FIG. 3 is a graph for explaining a method for controlling electric power of a mild hybrid electric vehicle according to an exemplary embodiment of the present invention.

If the high voltage generated from the MHSG 30 remains in the power-net for a predetermined time, a portion connected to a corresponding wiring may be damaged, therefore the MHSG 30 and LDC 50 may be operated simultaneously to convert the voltage generated from the MHSG 30 through the LDC 50. Furthermore, the controller operates the LDC 50 for a sufficient time such that there is not remaining voltage in 48 power-net to induce electric conversion.

As shown in FIG. 3, the MHSG 30 and LDC 50 operate simultaneously, the MHSG 30 generates a high voltage during T1, the LDC 50 operates during T2 which is longer than T1, and the high voltage generated from the MHSG 30 is immediately converted.

As explained above, according to an exemplary embodiment of the present invention, charging function is shut off so that electric power generated from the MHSG is not absorbed, therefore additional vehicle damage is prevented from, and electric power conversion and charging to the low electric power battery is induced to assist temporary driving.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents

What is claimed is:

1. A method for controlling a mild hybrid electric vehicle, the method comprising:
   detecting degradation state of a first battery;
   determining, by a controller, whether the detected degradation state of the first battery exceeds a degradation reference value;
   stopping, by the controller, normal operation of a mild hybrid starter & generator (MHSG) when the detected degradation state of the first battery exceeds the degradation reference value;
   warning a driver, by the controller, of the degradation state of the first battery after the stopping of the normal operation of the MHSG when the degradation state of the first battery exceeds the degradation reference value;
   after warning the driver of the degradation state of the first battery, determining, by the controller, whether an SOC value of a second battery is below a charge reference value; and
   operating, by the controller, the MHSG restrictively and inducing electric power conversion to the second battery when the SOC value of the second battery is below the charge reference value,
   wherein at the operating the MHSG restrictively and inducing electric power conversion to the second battery, an electric power generated from the MHSG is converted by a low voltage DC-DC converter (LDC) and sent to the second battery so that the second battery is charged,
   wherein at the operating the MHSG restrictively and inducing electric power conversion to the second battery, the MHSG generates the electric power during a first predetermined time period, and the electric power is sent to the second battery during a second predetermined time period, and
   wherein at the operating the MHSG restrictively and inducing electric power conversion to the second battery, the controller sends a signal so that the MHSG and the LDC operate simultaneously, and a high voltage generated from the MHSG during the first predetermined time period is temporarily stored, and the LDC converts the high voltage stored during the second predetermined time period.

2. The method of claim 1, wherein the degradation state of the first battery is detected by at least one of vehicle starting time, charging time of the first battery, a number of times of voltage variation of the first battery, a maximum absolute value of the voltage variation of the first battery, and an internal temperature of the first battery.

3. The method of claim 1, wherein the first battery is a 48V battery, and the second battery is a 12V battery.

4. The method of claim 1, wherein at the stopping of the normal operation of the MHSG, the electric power generated from the MHSG is not charged at the first battery.

5. An apparatus for controlling electric power of a mild hybrid electric vehicle, the apparatus comprising:
   an engine;
   a mild hybrid starter & generator (MHSG) connected to the engine, wherein the MHSG is configured of starting the engine or of generating electric power by output of the engine;
   a first battery connected to the MHSG, wherein the first battery is configured of supplying electricity to the MHSG or of being charged by electricity recovered by the MHSG; and
   a controller connected to the MHSG, wherein the controller is configured of stopping normal operation of the MHSG when a degradation state of the first battery exceeds a degradation reference value,
   wherein the controller is configured to determine whether a state of charge (SOC) value of a second battery is below a charge reference value when the degradation state of the first battery exceeds the degradation reference value, and is configured to operate the MHSG restrictively and to induce electric power conversion to the second battery when the SOC value of the second battery is below the charge reference value,
   wherein the controller is configured to control such that the electric power generated from the MHSG is converted to the second battery by a low voltage DC-DC converter (LDC) so that the second battery is charged when the degradation state of the first battery exceeds the degradation reference value and the SOC value of the second battery is below the charge reference value,
   wherein the controller is configured to control such that the MHSG generates the electric power during a first predetermined time period, and the electric power is sent to the second battery during a second predetermined time period, and
   wherein at the operating the MHSG restrictively and inducing electric power conversion to the second battery, the controller sends a signal so that the MHSG and the LDC operate simultaneously, and a high voltage generated from the MHSG during the first predetermined time period is temporarily stored, and the LDC converts the high voltage stored during the second predetermined time period.

6. The apparatus of claim 5, wherein the degradation state of the first battery is detected by at least one of vehicle starting time, charging time of the first battery, a number of times of voltage variation of the first battery, a maximum absolute value of the voltage variation of the first battery, and an internal temperature of the first battery.

7. The apparatus of claim 5, wherein the first battery is a 48V battery, and the second battery is a 12V battery.

8. The apparatus of claim 5, wherein the controller is configured to control such that the electric power generated from the MHSG is not charged at the first the degradation state of the first battery exceeds the degradation reference value.

9. The apparatus of claim 5, wherein the controller is configured to control to warn a driver of the degradation state of the first battery when the degradation state of the first battery exceeds the degradation reference value.

* * * * *